(12) United States Patent
Chauhan et al.

(10) Patent No.: US 11,356,266 B2
(45) Date of Patent: Jun. 7, 2022

(54) USER AUTHENTICATION USING DIVERSE MEDIA INPUTS AND HASH-BASED LEDGERS

(71) Applicant: Bank of America Corporation, Charlotte, NC (US)

(72) Inventors: Sandeep Kumar Chauhan, Hyderabad (IN); Sarat Kumar Magatapalli, Hyderabad (IN); Yash Sharma, Delhi (IN)

(73) Assignee: Bank of America Corporation, Charlotte, NC (US)

( * ) Notice: Subject to any disclaimer, the term of this patent is extended or adjusted under 35 U.S.C. 154(b) by 153 days.

(21) Appl. No.: 17/019,079

(22) Filed: Sep. 11, 2020

(65) Prior Publication Data

US 2022/0086004 A1 Mar. 17, 2022

(51) Int. Cl.
*H04L 9/32* (2006.01)
*H04L 9/06* (2006.01)

(52) U.S. Cl.
CPC .......... *H04L 9/3226* (2013.01); *H04L 9/0637* (2013.01); *H04L 9/0643* (2013.01); *H04L 2209/38* (2013.01)

(58) Field of Classification Search
CPC ... H04L 9/3226; H04L 9/0637; H04L 9/0643; H04L 2209/38
See application file for complete search history.

(56) References Cited

U.S. PATENT DOCUMENTS

| | | | |
|---|---|---|---|
| 6,640,145 B2 | 10/2003 | Hoffberg et al. | |
| 7,571,471 B2 | 8/2009 | Sandhu et al. | |
| 7,734,045 B2 | 6/2010 | Sandhu et al. | |
| 7,756,348 B2 | 7/2010 | Mukherjee et al. | |
| 7,949,186 B2 | 5/2011 | Grauman et al. | |
| 7,958,063 B2 | 6/2011 | Long et al. | |
| 8,578,508 B2 | 11/2013 | Takashima | |
| 8,958,566 B2 | 2/2015 | Hellmuth et al. | |
| 9,037,867 B2 | 5/2015 | Ueda et al. | |
| 9,082,165 B2 | 7/2015 | Guissin | |
| 9,495,591 B2 | 11/2016 | Visser et al. | |
| 9,805,726 B2 | 10/2017 | Adami et al. | |
| 9,852,737 B2 | 12/2017 | Kim et al. | |
| 9,870,508 B1 | 1/2018 | Hodgson et al. | |
| 9,961,316 B2 | 5/2018 | Tan et al. | |
| 9,967,261 B2 | 5/2018 | Liebl, III et al. | |
| 10,261,846 B1 * | 4/2019 | Patton | H04L 41/145 |

(Continued)

OTHER PUBLICATIONS

U.S. Appl. No. 17/018,918, filed Sep. 11, 2020, Chauhan et al.

*Primary Examiner* — Darren B Schwartz (57) ABSTRACT

A system receives a login sample. The login sample is decomposed into first and second layers. A verification media sample is decomposed into first and second layers. The system determines that the first layer of the login sample does not match the first layer of the verification sample, that the second layer of the login sample does not match the second layer of the verification sample, or both. First and second critical portions are extracted from the login sample. A first and second login hash are generated from the first and second critical portions. A first and second ledger hash are retrieved from a blockchain ledger. It's determined that the first login hash does not match the first ledger hash, the second login hash does not match the second ledger hash, or both. The user is flagged.

20 Claims, 7 Drawing Sheets

(56) References Cited

U.S. PATENT DOCUMENTS

| | | | |
|---|---|---|---|
| 10,348,505 B1* | 7/2019 | Crawforth | H04L 9/3297 |
| 10,396,985 B1* | 8/2019 | Nagelberg | H04L 9/3239 |
| 10,475,272 B2 | 11/2019 | Campero et al. | |
| 10,476,675 B2 | 11/2019 | Narendra et al. | |
| 10,530,577 B1* | 1/2020 | Pazhoor | H04L 9/3239 |
| 10,554,414 B1* | 2/2020 | Winarski | H04N 21/835 |
| 10,602,202 B1* | 3/2020 | Taylor | H04L 9/3242 |
| 10,681,377 B2 | 6/2020 | Adams et al. | |
| 10,692,054 B2 | 6/2020 | Chow et al. | |
| 10,715,329 B1* | 7/2020 | Wellman | H04L 9/0894 |
| 10,735,193 B1* | 8/2020 | Knas | H04L 63/0428 |
| 10,880,089 B2* | 12/2020 | Brown | H04L 63/12 |
| 10,972,475 B1* | 4/2021 | Zaki | H04L 9/3239 |
| 11,025,646 B2* | 6/2021 | Ford | G06F 21/604 |
| 11,074,650 B1* | 7/2021 | Madisetti | H04L 9/3239 |
| 11,101,995 B1* | 8/2021 | Oliver | H04N 21/8358 |
| 11,128,442 B1* | 9/2021 | Deshpande | H04L 9/0618 |
| 2004/0208493 A1 | 10/2004 | Kashiwa et al. | |
| 2008/0039140 A1 | 2/2008 | Morris et al. | |
| 2012/0323717 A1 | 12/2012 | Kirsch | |
| 2013/0014248 A1* | 1/2013 | McLaughlin | G06F 3/04883 726/17 |
| 2014/0372754 A1* | 12/2014 | Aissi | H04L 9/0861 713/168 |
| 2015/0005032 A1 | 1/2015 | Fletcher et al. | |
| 2016/0261411 A1 | 9/2016 | Yau et al. | |
| 2016/0283941 A1 | 9/2016 | Andrade | |
| 2017/0099149 A1 | 4/2017 | Eber et al. | |
| 2017/0134162 A1* | 5/2017 | Code | H04L 9/0643 |
| 2017/0206523 A1 | 7/2017 | Goeringer et al. | |
| 2017/0257358 A1* | 9/2017 | Ebrahimi | H04L 63/061 |
| 2018/0115416 A1* | 4/2018 | Diehl | H04L 9/0819 |
| 2018/0121635 A1* | 5/2018 | Tormasov | G06F 21/16 |
| 2018/0152297 A1 | 5/2018 | Fielding et al. | |
| 2018/0198630 A1 | 7/2018 | Androulaki et al. | |
| 2018/0218358 A1 | 8/2018 | Mardikar | |
| 2018/0232526 A1* | 8/2018 | Reid | H04L 9/3239 |
| 2018/0270065 A1 | 9/2018 | Brown et al. | |
| 2018/0294957 A1 | 10/2018 | O'Brien et al. | |
| 2018/0343120 A1 | 11/2018 | Andrade | |
| 2019/0005154 A1* | 1/2019 | Tripathi | G06F 16/345 |
| 2019/0058709 A1* | 2/2019 | Kempf | H04L 9/3239 |
| 2019/0092279 A1 | 3/2019 | Jarvis et al. | |
| 2019/0140844 A1 | 5/2019 | Brown et al. | |
| 2019/0158274 A1* | 5/2019 | Tormasov | H04L 9/0637 |
| 2019/0158481 A1 | 5/2019 | Ronda et al. | |
| 2019/0182042 A1* | 6/2019 | Ebrahimi | H04L 63/083 |
| 2019/0236598 A1* | 8/2019 | Padmanabhan | G06N 20/00 |
| 2019/0253406 A1* | 8/2019 | Johri | G06Q 20/40 |
| 2019/0273617 A1 | 9/2019 | Maher | |
| 2019/0281028 A1 | 9/2019 | Gillan et al. | |
| 2019/0311148 A1* | 10/2019 | Andrade | H04L 9/0643 |
| 2019/0312863 A1* | 10/2019 | Chow | H04L 9/3247 |
| 2019/0325432 A1* | 10/2019 | Ow | H04L 9/0861 |
| 2019/0333058 A1* | 10/2019 | Hong | G06Q 20/4018 |
| 2019/0342344 A1 | 11/2019 | Anton et al. | |
| 2019/0363889 A1 | 11/2019 | Wang | |
| 2019/0370479 A1 | 12/2019 | Uhr et al. | |
| 2019/0378142 A1 | 12/2019 | Darnell et al. | |
| 2020/0012806 A1 | 1/2020 | Bates et al. | |
| 2020/0026834 A1 | 1/2020 | Vimadalal et al. | |
| 2020/0036707 A1 | 1/2020 | Callahan et al. | |
| 2020/0051232 A1* | 2/2020 | McGregor | G06F 16/583 |
| 2020/0074059 A1* | 3/2020 | Beckett, Jr. | H04L 9/3218 |
| 2020/0074111 A1* | 3/2020 | Mitchell | H04L 67/20 |
| 2020/0092301 A1 | 3/2020 | Coffing | |
| 2020/0106708 A1 | 4/2020 | Sleevi | |
| 2020/0162236 A1 | 5/2020 | Miller et al. | |
| 2020/0175136 A1* | 6/2020 | Chen | H04L 9/3239 |
| 2020/0204557 A1* | 6/2020 | Singh | G06F 21/577 |
| 2020/0210956 A1 | 7/2020 | De Malzac de Sengla et al. | |
| 2020/0374129 A1* | 11/2020 | Dilles | G06F 21/45 |
| 2021/0176054 A1* | 6/2021 | Zabar | H04L 9/3239 |
| 2021/0342967 A1* | 11/2021 | Popov | H04L 9/0822 |

\* cited by examiner

USER AUTHENTICATION USING DIVERSE MEDIA INPUTS AND HASH-BASED LEDGERS

TECHNICAL FIELD

This disclosure relates generally to information security. More specifically, this disclosure relates to user authentication using diverse media inputs and hash-based ledgers.

BACKGROUND

User authentication may be requested before a user is granted access to secure information and/or services. The purpose of user authentication is to determine that the user is an authorized individual who should be granted access to the secure information and/or services. For example, a user may be requested to provide a username and password to access a secure service. Additionally, biometric features—visual appearance, voice, fingerprint etc. —that are unique to a user may be used to authenticate a user's identity. When prompted, the user may record a video, submit a photo, or record an audio message for the computer to analyze and compare with the authentic user's features.

The use of many such authentication mechanisms is complicated by the rise of synthetic media (i.e., media that is artificially produced, manipulated, and/or modified). Synthetic media can be used to fool biometric authentication mechanisms by inputting a computer-generated media sample instead of actually recording information related to the individual trying to bypass the authentication mechanism. Synthetic media, often referred to as "deepfakes," are generated using generative machine learning. The algorithms employed improve at a rapid pace, making it more difficult to distinguish deepfakes from authentic media.

SUMMARY OF THE DISCLOSURE

According to one embodiment, a system for authenticating a user action comprises a memory and a hardware processor. The memory is configured to store a verification media sample and a hash function. The verification media sample comprises a media sample associated with an entity. The media sample comprises a portion that is designated as critical. A portion is critical if it is designated to be used as a unique identifier of the entity. The processor is configured to receive a login sample. The login sample comprises a media sample for determining whether a user is the entity it purports to be. The processor is further configured to decompose the login sample into a first and second layer. The first layer comprises a first separable code element of the login sample. The second layer comprises a second separable code element of the login sample. The processor is also configured to decompose the verification media sample into a first and second layer. The first layer comprises a first separable code element of the verification media sample. The second layer comprises a second separable code element of the verification media sample. The processor is then configured to determine that the first layer of the login sample does not match the first layer of the verification media sample, that the second layer of the login sample does not match the second layer of the verification media sample, or both. The processor is also configured to receive an indication designating a portion of the login sample as critical. The processor is further configured to extract a first and second critical portion from the first and second layers, respectively. The first and second critical portions comprise information associated with the portion of the login sample designated as critical. Additionally, the processor is configured to apply the hash function to the first critical portion to generate a first login hash value. The processor is configured to apply the hash function to the second critical portion to generate a second login hash value. Additionally, the processor is configured to retrieve a first ledger hash value associated with the first layer of the verification media sample and a second ledger hash values associated with the second layer of the verification media sample from a block in a blockchain ledger. The processor is then configured to determine that the first login hash does not match the first ledger hash, the second login hash does not match the ledger hash, or both. Finally, the processor is configured to flag the user as not the entity it purports to be.

Certain embodiments provide one or more technical advantages. As an example, an embodiment improves the accuracy of an authentication method by enabling multi-layer analysis of input media samples. Simple single-layer analysis of media samples is more likely to miss subtle differences between synthetic media and genuine samples that the synthetic media aims to replicate. Additionally, some embodiments generate a unique signature that can be stored in a blockchain ledger. The signature comprises selected portions of a media sample that are designated as critical, and authentication requires comparing the selected portions of the media to reference data that only matches those portions of the media sample. Thus, even if a synthetic media sample were to achieve perfect matching with reference media, the authentication sample would ferret out an entity submitting the synthetic media sample because the authentication system would require the entity to select a portion of their submitted media sample that correlates precisely with the reference media sample. As another example, an embodiment is capable of detecting differences between synthetic media and a reference media sample by comparing hash values generated from the two media samples. If any portion of the media samples deviate from each other, then the hash values will not match.

The system described in this disclosure may be integrated into a practical application of an identity verification tool to limit access to physical locations, electronic data, online user accounts, or individual internet transactions. For example, the disclosed system may be integrated into an authentication mechanism for logging into a user account for a mobile application. Additionally, the disclosed system may be deployed as a second authentication factor in a two-factor authentication scheme. The disclosed system and methods may further be deployed to verify individual internet data transfers by using camera and microphone inputs of a user device to observe who is making the transaction and confirm that synthetic media is not being submitted to circumvent the authentication measures.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1-7 of the drawings, like numerals being used for like and corresponding parts of the various drawings.

Multi-Media Identity Verification System Overview

Figure 1:
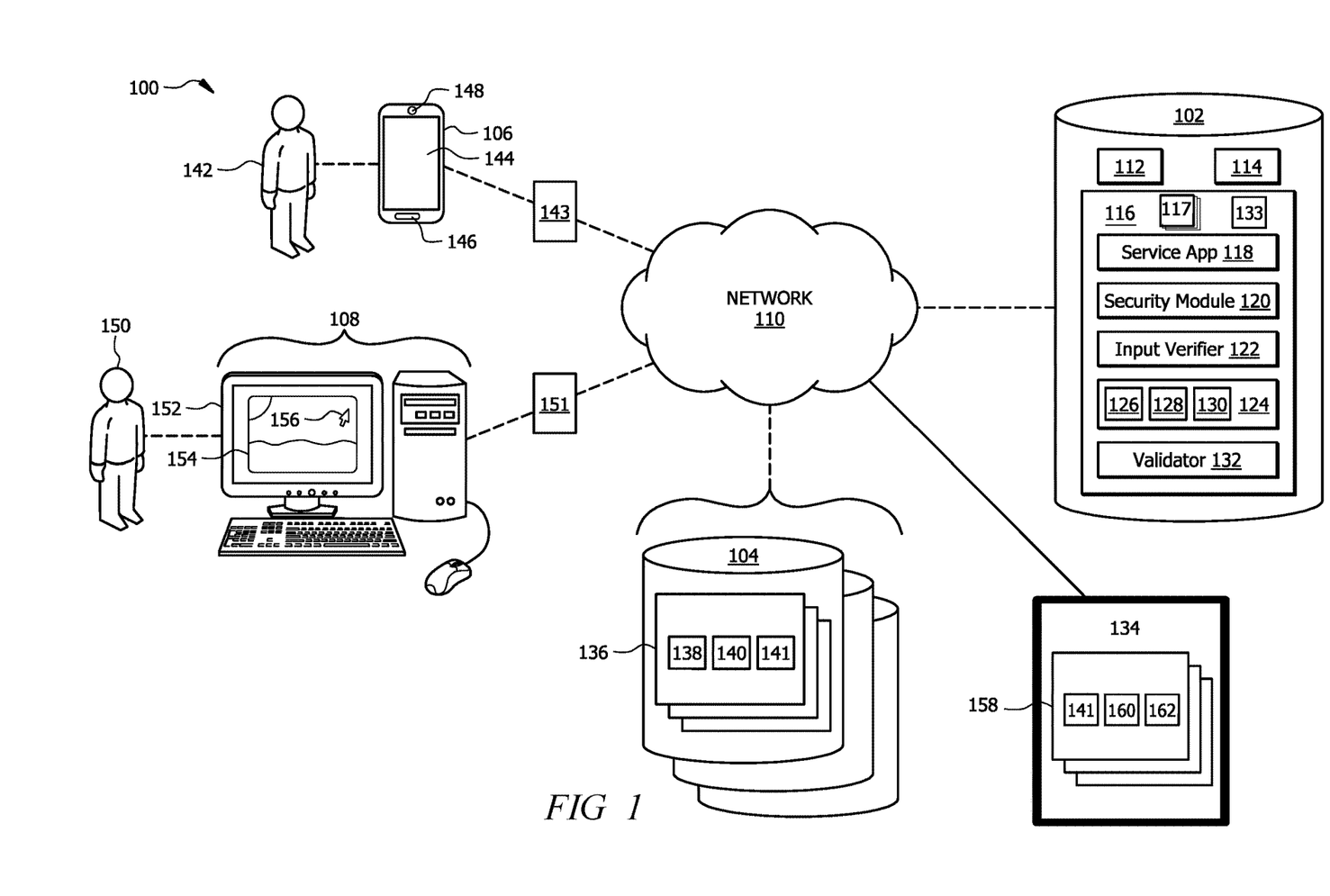
FIG. 1 illustrates an example multi-media identity verification system.

FIG. 1 illustrates an example multi-media identity verification system 100. The example system 100 is generally configured to receive media samples (e.g., video recording of a user, photo of a user, recording of a user's voice, scanned image, etc.) and compare selected portions of the media sample to reference data stored in a blockchain ledger. In a practical application of the method performed by the identity verification system 100, the security of internet data transfers, user interactions, and financial transactions is increased by a unique hash-based, blockchain ledger that leverages multi-layer analysis of digital media samples. Users register a profile with a mobile or web-based application. The authentication methods detailed in this disclosure are applicable across a wide variety of digital contexts. When creating a profile, users select a media sample as a verification method. The verification system 100 decomposes the media sample and uses data extracted from the decomposed sample to generate hash values that are then stored in a blockchain ledger. When users log into the application or attempt to perform certain actions using the application, they submit a login media sample that the verification system 100 then compares to data in the hash-based, blockchain ledger. This arrangement filters out deepfakes that malicious actors might submit to circumvent the media sample verification mechanism. The improved security enabled by this practical application enables digital relationships and transactions to continue as deepfakes become increasingly more difficult to detect.

In one embodiment, the multi-media identity verification system 100 comprises an authentication server 102, database 104, and user devices 106 and 108. The authentication server 102, database 104, and user devices 106 and 108 communicate through network 110. Network 110 facilitates communication between and amongst the various components of the system 100. This disclosure contemplates network 110 being any suitable network operable to facilitate communication between the components of the system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Authentication Server

An example authentication server 102 includes processor 112, network interface 114, and memory 116. The processor 112 comprises one or more processors operably coupled to the memory 116. The processor 112 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 112 may be a programmable logic device, a microcontroller, a microprocessor, or any suitable combination of the preceding. The one or more processors are configured to process data and may be implemented in hardware or software. For example, the processor 112 may be 8-bit, 16-bit, 32-bit, 64-bit or of any other suitable architecture. The processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors 112 are configured to implement various instructions 117. For example, the one or more processors 112 are configured to execute one or more sets of instructions 117 to implement a service application 118, a security module 120, an input verifier 122, one or more media handlers 124, and a validator module 132. In this way, processor 112 may be a special purpose computer designed to implement the functions disclosed herein. In an embodiment, the service application 118, a security module 120, an input verifier 122, one or more media handlers 124, and/or a validator module 132 are implemented using logic units, FPGAs, ASICs, DSPs, or any other suitable hardware. For example, the service application 118 may be configured to perform one or more steps of the operational flow 600 as described in FIG. 6. The security module 120 may be configured to perform one or more steps (e.g., step 304) of a method 300 as described in FIG. 3. The input verifier 122 may be configured to perform one or more steps of a method 500 as described in FIG. 5. The media handlers 124 may be configured to perform one or more steps (e.g., step 504) of a method 500 as described in FIG. 5. The validator module 132 may be configured to perform one or more steps (e.g., steps 506-526) of a method 500 as described in FIG. 5.

The network interface 114 is configured to enable wired and/or wireless communications. The network interface 114 is configured to communicate data between the authentication server 102 and other devices (e.g., database 104 and user devices 106 and 108), systems, or domains. For example, the network interface 114 may comprise a WIFI interface, a LAN interface, a WAN interface, a modem, a switch, or a router. The processor 112 is configured to send and receive data using the network interface 114. The network interface 114 may be configured to use any suitable type of communication protocol as would be appreciated by one of ordinary skill in the art.

Memory 116 comprises one or more disks, tape drives, or solid-state drives, and may be used as an over-flow data storage device, to store programs when such programs are selected for execution, and to store instructions and data that are read during program execution. The memory 116 may be volatile or non-volatile and may comprise read-only memory (ROM), random-access memory (RAM), ternary content-addressable memory (TCAM), dynamic random-access memory (DRAM), and static random-access memory (SRAM).

The memory 116 is operable to store instructions 117, a service application 118, a security module 120, an input verifier 122, one or more media handlers 124, a validator module 132, and a hash function 133. The service application 118 is generally any mobile or web-based application or other website that users may access to communicate, transfer digital information, or conduct electronic transactions. Examples of service application 118 are discussed in more detail in FIG. 2. Operation of security module 120 is discussed in more detail in FIG. 2. Operation of input verifier 122 is discussed in more detail in FIG. 4. Media Handler Modules 124 may include a voice handler 126, image handler 128, and video handler 130. Operation of the media handler modules 124 is discussed in more detail in FIGS. 4-6. Operation of validator module 132 is discussed in more detail in FIGS. 4 & 6-7. The hash function 133 may be MD2, MD4, MD5, MD6, SHA-1, RIPEMD-160, RIPEMD-320, bcrypt, Whirlpool, Streebog, Tiger, SHA-2, SHA-3, KangarooTwelve, BLAKE, BLAKE2, or BLAKE3, among others. These examples are not limiting, and one skilled in the art will appreciate that alternate algorithms may be used to achieve a similar result. The role of hash function 133 is discussed in more detail in FIGS. 3-6.

Database 104 is generally any database (i.e., including hardware and/or software) operable to store information used by the authentication server 102. While database 104 is depicted as remote from authentication server 102, alternate embodiments may incorporate database 104 into memory 116 of authentication server 102. The database 104 stores user profiles 136. Each user of a service application 118 has an associated user profile 136. Each user profile 136 comprises a password 138, a verification media sample 140, and a user identifier 141. The password 138 may be comprised of any number of characters or symbols. The verification media sample 140 may be an audio file, a video file, an image file, a text file, or any hybrid media format. The verification media sample 140 is selected by the user when they create a user profile 136. Generally, the verification media sample 140 is used as part of an authentication mechanism for the user. The user identifier 141 is any string of characters or symbols that uniquely associates the user profile 136 with a specific user of a service application 118. Database 104 and the information stored within are discussed in more detail in FIGS. 2-7.

User Devices

User devices 106 and 108 are generally any computing devices operable to run a service application 118 and receive login and verification information from users 142 and 150, respectively. As such, a user device generally includes a user interface operable to display login prompts and media samples used to authenticate the user's identity. The user devices 106 and 108 also include mechanisms for the user to input media samples and to interact with the media sample on a visual display. The user devices 106 and 108 transmit authentication data 143 and 151, respectively, to the authentication server 102 through network 110. Authentication data 143 and 151 may include a user identifier and a password used to log into a user account. The authentication data 143 and 151 may also include data related to a media sample submitted by the user 142 or 150 to authenticate its identity. In the example of FIG. 1, user device 106 is a smartphone that includes a display 144, a microphone 146, and a camera 148. The display 144 may be a touch-screen configured to receive inputs from user 142 through touch and hand gestures. The display is also configured to display a service application 118 and any authentication prompts used by the application 118. The camera 148 can take both still photographs and videos.

User device 108 serves the same general function as user device 106 but is illustrated to show that the authentication methods described in this disclosure can be implemented on any computing device that can access software applications or websites that require authentication over a communications network. The user device 108 represents a personal computer. The user device 108 includes a display 152 that is configured to display a login sample 154. The login sample 154 is presented to user 150 to authenticate that the user 150 is indeed user 150. Cursor 156 may be used to select a portion of the login sample 154 for use in the authentication process. The role of user devices 106 and 108 are described in more detail along with the authentication process in FIGS. 2-7.

Blockchain ledger 134 is an open, decentralized and distributed digital ledger consisting of records called blocks that are used to record transactions across many nodes (e.g., authentication server 102, user devices 106 and 108, and any other computing device capable of communicating through network 110). Each node of a blockchain network (e.g., authentication server 102, user devices 106 and 108, and any other computing device capable of communicating through network 110) may store and maintain a copy of the blockchain ledger 134. Logically, a blockchain ledger 134 is a chain of blocks which contains specific information. Once recorded, the data in any given block cannot be altered retroactively without alteration of all subsequent blocks, which requires consensus of the network majority. Each node within the network maintains, approves, and updates new entries. The system is controlled not only by separate individuals, but by everyone within the blockchain network. Each member ensures that all records and procedures are in order, which results in data validity and security. By design, a blockchain is resistant to modification of the data. For use as a distributed ledger, a blockchain is typically managed by a peer-to-peer network collectively adhering to a protocol for inter-node communication and validating new blocks. Each block of the blockchain ledger 134 includes a user profile 158. The user profile 158 includes a user identifier 141 that links the block to a specific user such as user 150. The user profile 158 also includes a media layer hash 162 and a media layer hash 164. The media layer hashes 162 and 164 are generated from a verification media sample 140 that the user submits upon registration with a service application 118. While only two media hashes are depicted, some embodiments will have more while some will have fewer. Further explanation of the blockchain ledger 134 and its contents is provided in FIGS. 2-7.

Generating a User Security Profile

Figure 2:
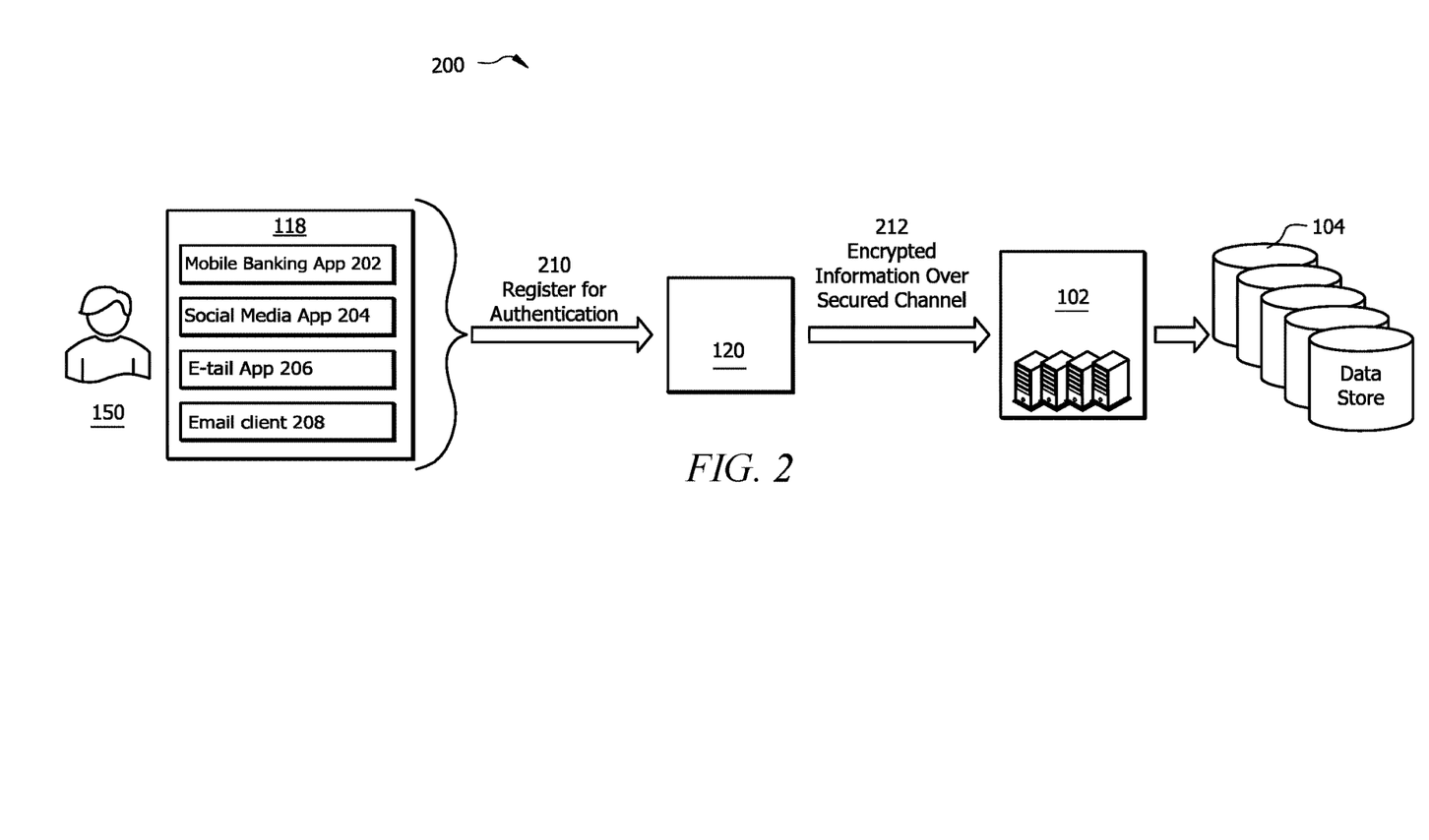
FIG. 2 is a schematic diagram illustrating the process flow for registration of a user security profile.

FIG. 2 illustrates a general process flow 200 for registering a user security profile. The user 150 first opens a service application 118 on user device 108. The service application may be a banking application 202, a social media application 204, an electronic retail application 206, or an email client 208. These applications are offered as examples and are not meant to limit the types of applications which may use the disclosed authentication methods. The first operation 210 after opening the application 118 is to register for authentication. The user 150 will create a user identifier 141, an alpha-numeric password 138 and upload a verification media sample 140 for processing by the security module 120. For the verification media sample 140, the user 150 will select a portion of the verification media sample 140 to use for authentication purposes. For example, if the verification media sample 140 is a photograph of user 150, then user 150 may select the portion of the photograph encompassing the left eye of user 150 to be used for verification purposes. Then, when the identity of user 150 needs to be verified in the future the user 150 will submit the photograph and select the portion encompassing the left eye. Thus, even if an imposter submits a deepfake that is nearly identical to the photograph it is less likely that the imposter will know to select the portion encompassing the left eye. Operation 212 involves encrypting the information generated by the security module and transmitting it over a secure communications channel (e.g., network 110) to authentication server(s) 102. The server or servers 102 may then store user profiles in one or more databases 104. Details about the registration process and function of security module 120 are discussed in FIG. 3.

Figure 3:
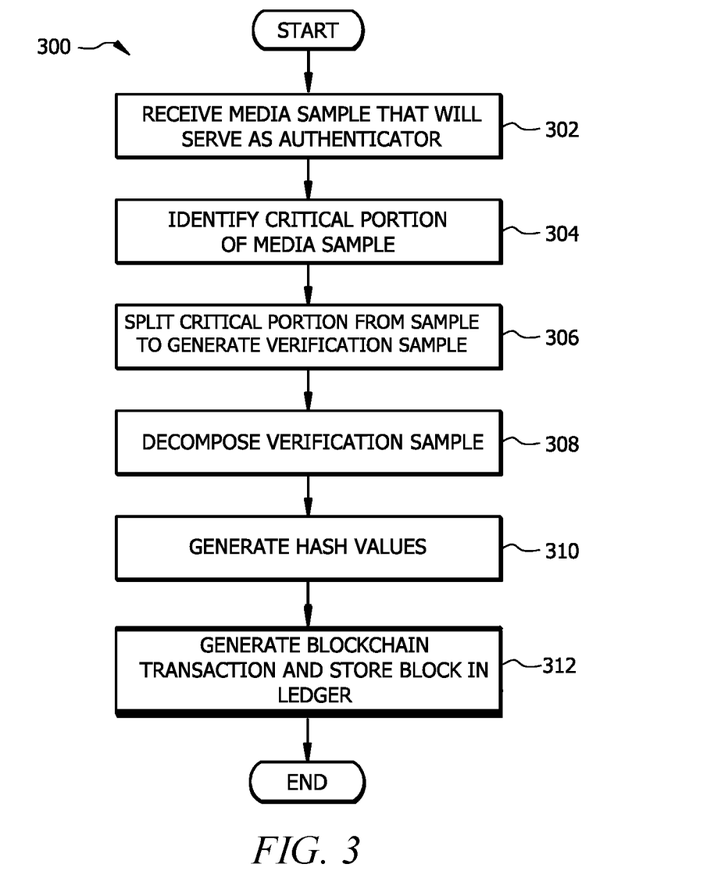
FIG. 3 is a flowchart of an example method for generating a user security profile for sue in a multi-media identity verification system.

FIG. 3 is a flowchart of an example method 300 for generating a user security profile for use in a multi-media identity verification system. The method 300 begins at step 302 where the security module 120 receives a media sample that will serve as an authenticator for user 150. For example, the security module 120 may receive a selfie of the user 150. Proceeding to step 304 the security module 120 identifies the critical portion of the media sample 154, in this example the selfie of user 150. The security module 120 may determine the critical portion based on input from user 150. For example, the user 150 may draw a circle around his left eye in the selfie to indicate that is the critical portion of the media sample 154 (selfie).

The user 150 may select any portion of the media sample 154 that is less than the whole sample. For example, in the case of an audio sample the critical portion may comprise a time span that is less than the full time-span of the audio track. When the media sample 154 is an image file, the critical portion may comprise a subset of the pixels of the image that is less than the total number of pixels in the image. When the media sample 154 is a video file, the critical portion may comprise a location in the video frame, the location comprising a defined subset of the pixels of the frame less than the total number of pixels, and a time span that is less than the full time-span of the video. When the media sample 154 is a text file, the critical portion may be a specific word or phrase.

Method 300 then proceeds to step 306 where the security module 120 splits the media sample into a verification sample comprising the critical portion of the media sample. In this example, the security module 120 would isolate the data in the selfie that is related to the encircled region around the left eye. At step 308, the security module 120 decomposes the verification sample into one or more component layers. For example, an audio file that is in stereo format may be decomposed into a first layer that comprises the left channel of the stereo track and into a second layer that comprises the right channel of the stereo track. An image file may be decomposed into a first layer comprising data generated using edge detection, a second layer comprising data generated using blob detection, and a third layer comprising data obtained using ridge detection. A video file may be decomposed into a first layer that comprises audio data of the video file and the second layer may comprise pixels from the video file. Layers may be generated by using any of a number of media analysis methods that can isolate features of a media sample. In this example, the security module 308 would decompose the verification sample into a layer that represents the pixel density and a layer that represents the color contrast. Then, at step 310, the security module 120 generates a hash value from the layers generated at step 308. In the present example the security module 120 would apply the hash function 133 to the pixel density data to generate a media layer hash 162, and it would apply the hash function 133 to the color contrast data to generate a media layer hash 164. At step 312 the security module 120 generates a blockchain transaction for the user profile 158 associated with user 150. The user profile 150 includes the media layer hashes 162 and 164 along with a user identifier 141. The blockchain transaction is stored as a block in a blockchain ledger 134. The block (i.e., the user profile 158) may be located in the blockchain by searching for the user identifier 141.

Multi-Media Identity Verification Process

Figure 4:
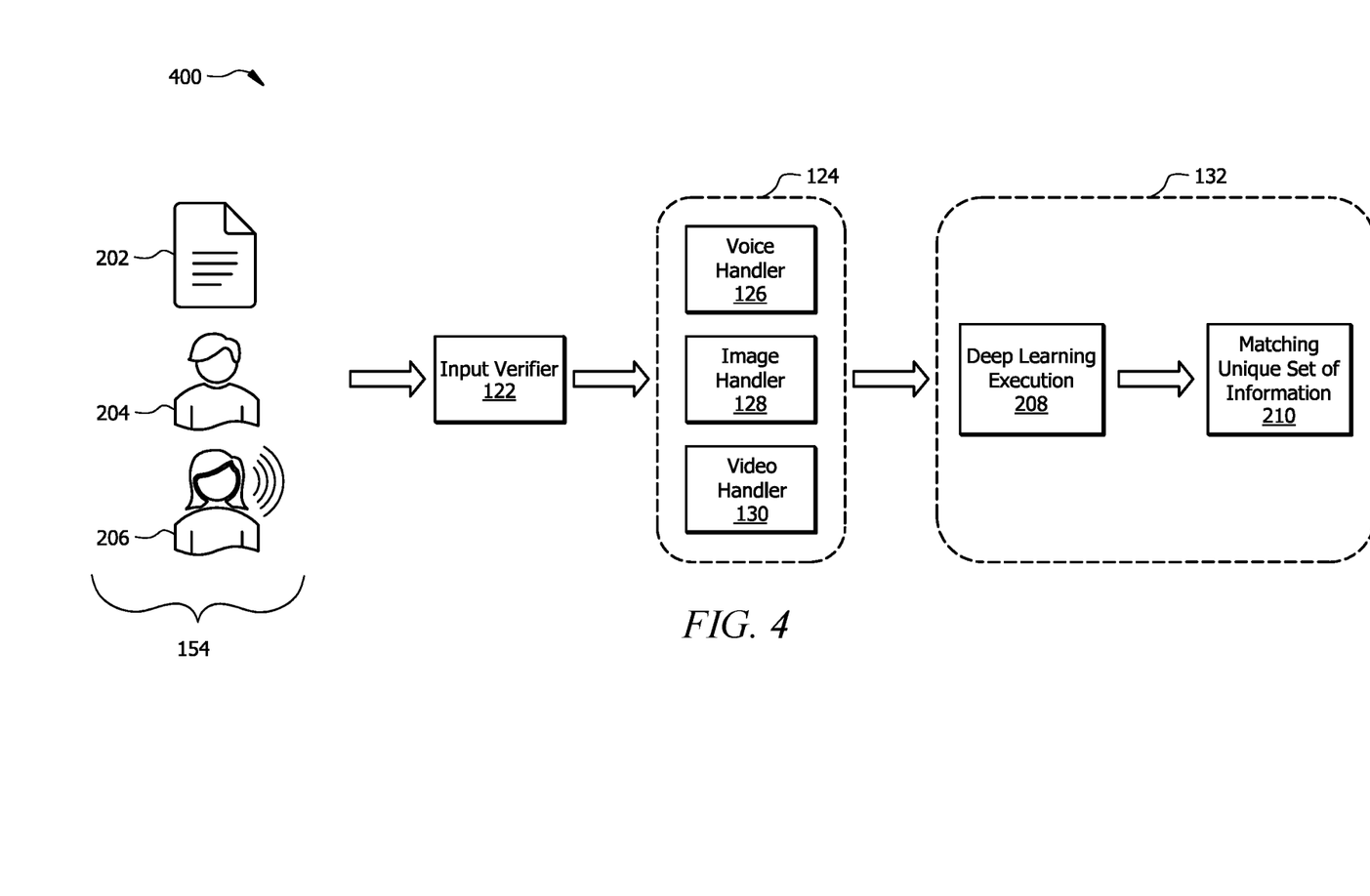
FIG. 4 is a schematic diagram illustrating the process flow of the multi-media identity verification system of FIG. 1.

FIG. 4 is a schematic diagram illustrating the process flow 400 of the multi-media identity verification system of FIG. 1. When a service application 118 prompts a user 150 to authenticate their identity, the user 150 will submit a login sample 154. While the login sample 154 illustrated in FIG. 1 is an image file, the login sample 154 may also be a text file 202, a video file 204, or an audio file 206. The application 118 transmits the login sample 154 to authentication server 102 where an input verifier 122 determines what type of media the login sample 154 is. The input verifier 122 then retrieves the appropriate media handler module 124 for processing that type of media. The media handler modules 124 are configured to isolate the critical portion of the login sample 154 and separate the login sample 154 into separate layers for analysis. In the current example, the input verifier 122 would retrieve the image handler 128 to process the login sample 154. Additional details about the operation of media handler modules 124 are provided in FIG. 5.

After the appropriate media handler module 124 extracts the relevant data from the login sample 154, the extracted data is analyzed by validator module 132. The validator module 132 uses deep learning techniques at operation 208 to compare the layers isolated from the login sample 154 to the corresponding layers in the verification media sample 140 in the user profile 136 associated with user 150. Then, at operation 210, the validator module 132 generates hash values from the isolated layers and compares these hash values to the media layer hash values 162 and 164 stored in the user profile 158 of blockchain ledger 134. An exact match between the hashes indicates that the login sample 154 is unaltered from the verification media sample 140. Accordingly, the authentication attempt will be approved. If the hashes do not match, then that indicates that login sample 154 has been altered or is a synthetic sample trying to replicate verification media sample 140. In such cases the authentication attempt will be denied and any action user 150 was trying to make will be denied. For example, if the user 150 is trying to make a data transfer through the service application 118 and the hashes do not match, the data transfer may be terminated.

Figure 5:
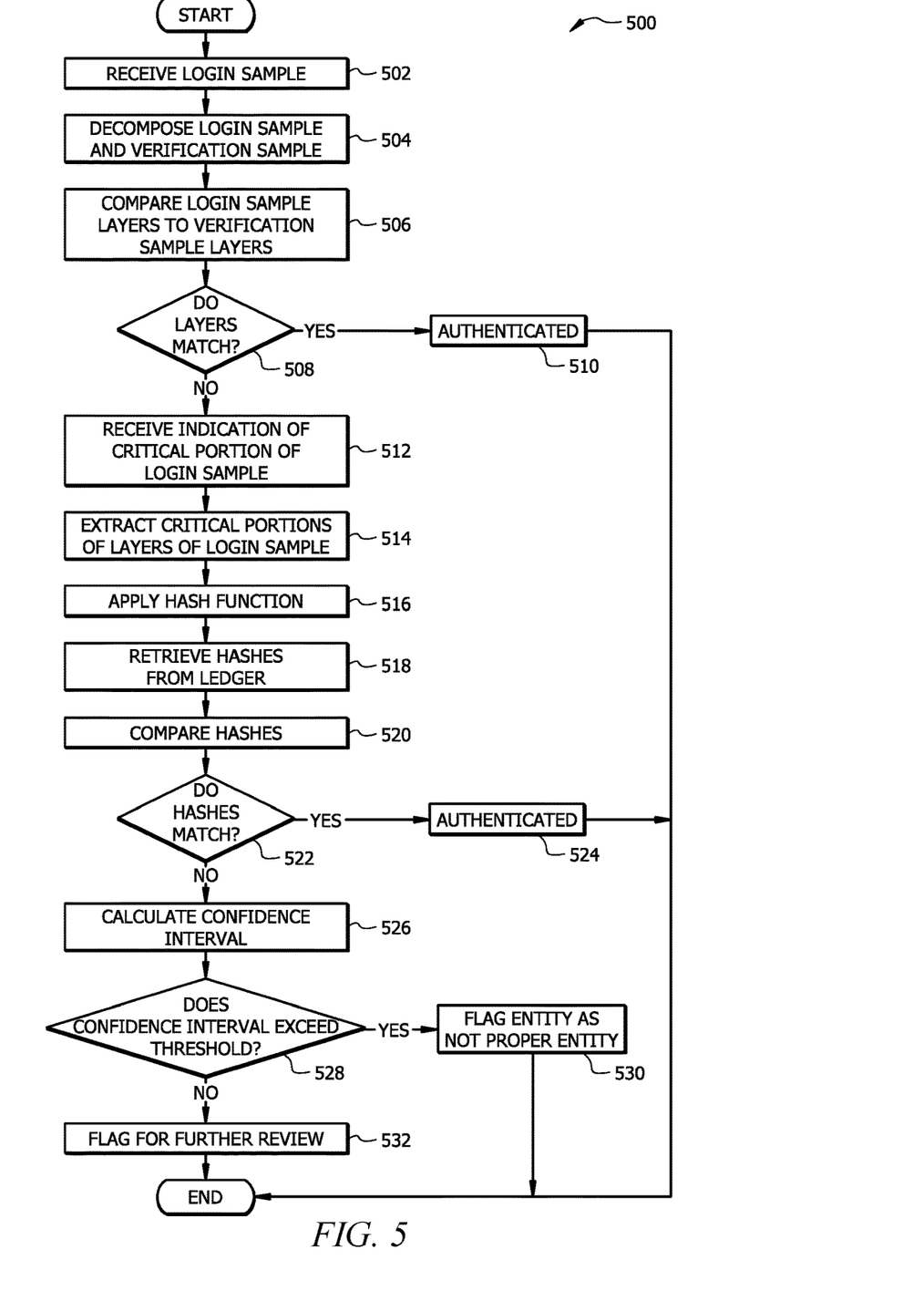
FIG. 5 is a flowchart of an example method for user authentication using diverse media inputs and hash-based ledgers.

FIG. 5 is a flowchart of an example method 500 for user authentication using diverse media inputs and hash-based ledgers. The method 500 begins at step 502 where the authentication server 102 receives a login sample 154. As discussed above, the login sample 154 may be one of several different media types. The following discussion uses FIG. 3, where the login sample 154 is a selfie, as an example.

Next, the validator module 132 decomposes the login sample 154 into a first and second layer at step 504. The first layer includes a first separable code element of the login sample 154. The second layer includes a second separable code element of the login sample 154. Separable code element refers to those portions of the code for the login sample 154 that may be isolated for specific features. As discussed above, there are numerous methods of decomposing a media sample into various layers (e.g., splitting stereo audio into left and right tracks, data generated from an edge detection algorithm, etc.). Continuing with the example from FIG. 3, the first separable layer would be the pixel density and the second layer would be the color contrast.

Using the same decomposition methods, the validator module 132 then decomposes the verification media sample 140, located based on the user identifier 141 associated with user 150, into a first and second layer. The first layer includes a first separable code element of the verification media sample 140. The second layer includes a second separable code element of the verification media sample 140.

At step 506 the validator module 132 compares the layers of the login sample 154 with the corresponding layers of the verification media sample 140. If the layers match at decision 508, then the user 150 is considered authenticated at step 510 and may complete its intended task. However, if either the first layer of the login sample 154 does not match the first layer of the verification media sample 140, the second layer of the login sample 154 does not match the second layer of the verification media sample 140, or both at decision 508, then further analysis is necessary.

When there is deviation between one or both layers, the method 500 proceeds to step 512 where the validator module 132 receives an indication designating a portion of the login sample as critical. As discussed above, this may be in the form of user 150 selecting a portion of the login sample 154. In the example of FIG. 3, user 150 selected the left eye of the selfie as the critical region, so at step 512 the validator module 132 would receive an indication that the critical region is the left eye of the selfie of user 150.

Then, at step 514, the validator module 132 will extract the critical portion from the first layer (pixel density) and second layer (color contrast) of the login sample 154 generated at step 504. The extracted critical portions comprise the information associated with the portion of the login sample 154 designated as critical (e.g., left eye of selfie).

At step 516 the validator module 132 will apply hash function 133 to the extracted first and second critical portions to generate a first and a second hash value. Thus, using the example of FIG. 3, the first hash is related to pixel density and the second hash is related to color contrast.

At step 518 the validator module 132 retrieves from a block in a blockchain ledger 134 hash values that correspond to the layers of the login sample 154. The validator module 132 locates the appropriate block in the blockchain ledger 134 by searching for the user identifier 141 in the block that matches the user identifier 141 in the user profile 136 stored in database 104. In this case the validator module 132 would retrieve media layer hash 162 and media layer hash 164 that represent hashes derived from the first and second layers, respectively, of the verification media sample 140.

At step 520, the validator module 132 then compares the media layer hash 162 to the first hash value generated at step 512. Validator module 132 also compares media layer hash 164 to the second hash value generated at step 514.

If the hash pairs match at decision 522, then at step 524 the identity of user 150 is considered authenticated and the user 150 may be granted access to all or a portion of the service application 118 or user 150 may be permitted to complete a data transfer through the service application 118.

If, however, one or both pairs of hash values do not match at decision 522, that indicates the login sample 154 does not match verification media sample 140. This indicates a likelihood that the received login sample 154 is not genuine. At step 526 the validator module 132 assigns a confidence interval to its determination that the media layer hash 162 does not match the first hash value generated at step 516, that the media layer hash 164 does not match the second hash value generated at step 516, or that both pairs don't match.

If the confidence interval calculated at step 526 exceeds a threshold at decision 528, then the identity of user 150 is not authenticated and the user 150 will be flagged at step 530 as not the entity it purports to be at step 524. Once flagged, any action user 150 was attempting to make using service application 118 will be denied. If the confidence interval calculated at step 520 does not exceed the threshold at decision 528, then the authentication attempt is flagged for further review at step 526. The system administrator may then conduct manual review of the login attempt or apply other machine learning methods to do the same.

Implementation in an Internet Transaction

Figure 6:
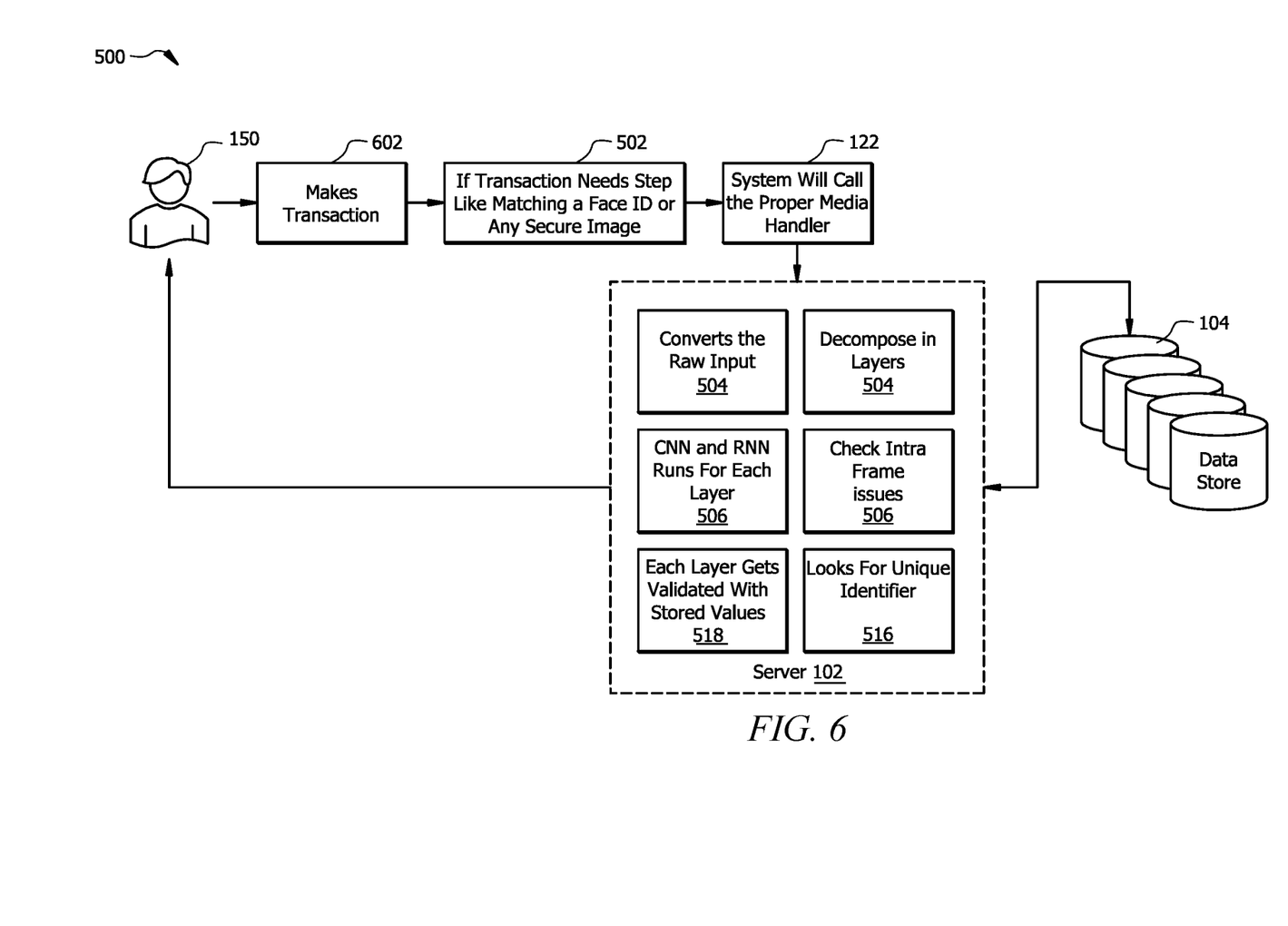
FIG. 6 is a schematic diagram illustrating the process flow of the method of FIG. 5.

FIGS. 5 and 6 taken together offer a schematic diagram illustrating the method of FIG. 5 in the context of an internet transaction. In the example of FIG. 6, the user 150 makes a financial transaction 602 using a banking service application 118 from the user device 108. At step 502, the user 150 is prompted to authenticate its identity by taking a selfie for processing. The input verifier 122 will then select the proper media handler 124. From there, the method 500 proceeds as described above. However, a few additional details are provided in this example. Step 504 requires conversion of the raw input of the selfie into its code form. Then the code may be decomposed in layers. The comparison of layers that occurs at step 106 utilizes a combination of a convolutional neural networks and a recurrent neural network to find differences in layers extracted from the selfie and layers extracted from the verification media sample stored in database 104. In this example, the layers did not match so the method proceeds to step 512. The method then proceeds as described in FIG. 5.

Figure 7:
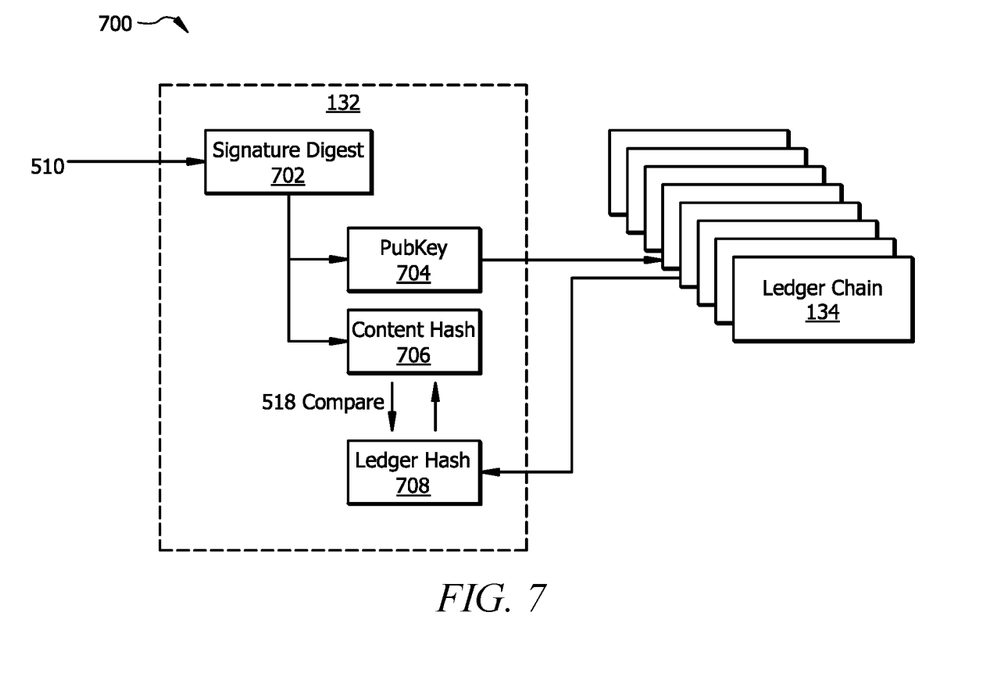
FIG. 7 is a schematic diagram illustrating the process flow of an example method carried out by an intelligent validator.

FIG. 7 provides additional details about how the hash-based ledger system works. The operational flow 700 picks up with step 512 of method 500. The indication of the critical portion of the login sample 154 arrives at the validator module 132 in the form of a signature digest 702. The signature digest 702 yields a public key 704 and a content hash 706. The public key 704 is used to decrypt information from the blockchain ledger 134. The content hash 706 is equivalent to the hash functions calculated from the login sample 154 at step 514. By applying the public key 704 to the blockchain ledger 134, the validator module 132 is able to determine a ledger hash 708. The ledger hash 708 is equivalent to the hash values (media layer hash 162 and media layer hash 164) read from the blockchain ledger 134 at step 516. As shown in FIG. 7, the validator module 132 may then compare the content hash 706 with the ledger hash 708 as described for step 520 of method 500.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for authentication a user action, comprising:
   a memory configured to store:
      a verification media sample, the verification media sample comprising a media sample associated with an entity, wherein the media sample includes a portion that is designated as critical, and wherein a portion is critical if it is designated to be used as a unique identifier of the entity;
      a hash function;
   a hardware processor communicatively coupled to the memory and configured to:
      receive a login sample, the login sample comprising a media sample for determining whether a user is the entity it purports to be;
      decompose the login sample into a first and second layer, wherein:
         the first layer comprises a first separable code element of the login sample; and
         the second layer comprises a second separable code element of the login sample;
      decompose the verification media sample into a first and second layer, wherein:
         the first layer comprises a first separable code element of the verification media sample; and
         the second layer comprises a second separable code element of the verification media sample;
      determine that the first layer of the login sample does not match the first layer of the verification media sample, that the second layer of the login sample does not match the second layer of the verification media sample, or both;
      receive an indication designating a portion of the login sample as critical;
      extract a first and second critical portion from the first and second layers, respectively, the first and second critical portions comprising information associated with the portion of the login sample designated as critical;
      apply the hash function to the first critical portion to generate a first login hash value;
      apply the hash function to the second critical portion to generate a second login hash value;
      retrieve, from a block in a blockchain ledger:
         a first ledger hash value associated with the first layer of the verification media sample;
         a second ledger hash values associated with the second layer of the verification media sample;
      determine that the first login hash does not match the first ledger hash, the second login hash does not match the ledger hash, or both;
      flag the user as not the entity it purports to be.

2. The system of claim 1, wherein the hardware processor is further configured to:
   calculate a confidence interval for the determination that the first login hash does not match the first ledger hash, the second login hash does not match the ledger hash, or both;
   determine that the confidence interval does not exceed a threshold; and
   flag the authentication attempt for further review.

3. The system of claim 1, wherein the user action being authenticated is a data transfer, and wherein the hardware processor is further configured to terminate the data transfer in response to the flag that the user is not the entity it purports to be.

4. The system of claim 1, wherein:
   the login sample comprises an identifier associated with the entity; and
   retrieving the first and second ledger hash comprises finding the block in the blockchain ledger that comprises the identifier associated with the entity.

5. The system of claim 4, wherein the hardware processor is further configured to:
   upon receipt of the login sample, determine that the login sample is an audio file comprising a stereo track;
   retrieve an audio handler comprising instructions for decomposing the login sample into the first and second layers, wherein the instructions are configured, when executed by the hardware processor, to:
      isolate the left channel of the stereo track as the first separable code element; and
      isolate the right channel of the stereo track as the second separable code element.

6. The system of claim 4, wherein the hardware processor is further configured to:
   upon receipt of the login sample, determine that the media sample is an image file;
   retrieve an image handler, comprising instructions for decomposing the login sample into the first and second layers, wherein the instructions are configured, when executed by the hardware processor, to:
      apply an edge detection algorithm to the image to generate the first separable code element; and
      apply a blob detection algorithm to the image to generate the second separable code element.

7. The system of claim 4, wherein the hardware processor is further configured to:
   upon receipt of the login sample, determine that the media sample is a video file;
   retrieve a video handler, comprising instructions for decomposing the login sample into the first and second layers, wherein the instructions are configured, when executed by the hardware processor, to:
      extract audio data from the video file as the first separable code element; and
      extract pixel data from the video file as the second separable code element.

8. A method for authenticating a user action, comprising:
   receiving a login sample, the login sample comprising a media sample for determining whether a user is the entity it purports to be;
   decomposing the login sample into a first and second layer, wherein:

the first layer comprises a first separable code element of the login sample; and the second layer comprises a second separable code element of the login sample;

decomposing a verification media sample into a first and second layer, the verification media sample comprising a media sample associated with an entity, wherein:

the media sample includes a portion that is designated as critical, and a portion is critical if it is designated to be used as a unique identifier of the entity;

the first layer comprises a first separable code element of the verification media sample; and the second layer comprises a second separable code element of the verification media sample;

determining that the first layer of the login sample does not match the first layer of the verification media sample, that the second layer of the login sample does not match the second layer of the verification media sample, or both receiving an indication designating a portion of the login sample as critical;

extracting a first and second critical portion from the first and second layers, respectively, the first and second critical portions comprising information associated with the portion of the login sample designated as critical;

applying a hash function to the first critical portion to generate a first login hash value;

applying the hash function to the second critical portion to generate a second login hash value;

retrieving, from a block in a blockchain ledger:

a first ledger hash value associated with the first layer of the verification media sample;

a second ledger hash values associated with the second layer of the verification media sample;

determining that the first login hash does not match the first ledger hash, the second login hash does not match the ledger hash, or both;

flagging the user as not the entity it purports to be.

9. The method of claim 8, further comprising:

calculating a confidence interval for the determination that the first login hash does not match the first ledger hash, the second login hash does not match the ledger hash, or both;

determining that the confidence interval does not exceed a threshold; and flagging the authentication attempt for further review.

10. The method of claim 8, wherein the user action being authenticated is a data transfer, and wherein the method further comprises terminating the data transfer in response to the flag that the user is not the entity it purports to be.

11. The method of claim 8, wherein:

the login sample comprises an identifier associated with the entity; and retrieving the first and second ledger hash comprises finding the block in the blockchain ledger that comprises the identifier associated with the entity.

12. The method of claim 11, further comprising:

upon receipt of the login sample, determining that the login sample is an audio file comprising a stereo track;

retrieving an audio handler comprising instructions for decomposing the login sample into the first and second layers, wherein the instructions comprise:

isolate the left channel of the stereo track as the first separable code element; and isolate the right channel of the stereo track as the second separable code element.

13. The method of claim 11, further comprising:

upon receipt of the login sample, determining that the media sample is an image file;

retrieving an image handler, comprising instructions for decomposing the login sample into the first and second layers, wherein the instructions comprise:

apply an edge detection algorithm to the image to generate the first separable code element; and apply a blob detection algorithm to the image to generate the second separable code element.

14. The method of claim 11, further comprising:

upon receipt of the login sample, determining that the media sample is a video file;

retrieving a video handler, comprising instructions for decomposing the login sample into the first and second layers, wherein the instructions comprise:

extract audio data from the video file as the first separable code element; and extract pixel data from the video file as the second separable code element.

15. A non-transitory computer-readable medium comprising instructions that, when executed by a hardware processor, are configured to:

receive a login sample, the login sample comprising a media sample for determining whether a user is the entity it purports to be;

decompose the login sample into a first and second layer, wherein:

the first layer comprises a first separable code element of the login sample; and the second layer comprises a second separable code element of the login sample;

decompose a verification media sample into a first and second layer, the verification media sample comprising a media sample associated with an entity, wherein:

the media sample includes a portion that is designated as critical, and a portion is critical if it is designated to be used as a unique identifier of the entity;

the first layer comprises a first separable code element of the verification media sample; and the second layer comprises a second separable code element of the verification media sample;

determine that the first layer of the login sample does not match the first layer of the verification media sample, that the second layer of the login sample does not match the second layer of the verification media sample, or both receive an indication designating a portion of the login sample as critical;

extract a first and second critical portion from the first and second layers, respectively, the first and second critical portions comprising information associated with the portion of the login sample designated as critical;

apply a hash function to the first critical portion to generate a first login hash value;

apply the hash function to the second critical portion to generate a second login hash value;

retrieve, from a block in a blockchain ledger:

a first ledger hash value associated with the first layer of the verification media sample;

a second ledger hash values associated with the second layer of the verification media sample;

determine that the first login hash does not match the first ledger hash, the second login hash does not match the ledger hash, or both;

flag the user as not the entity it purports to be.

16. The non-transitory computer-readable medium of claim 15, further comprising instructions that, when executed by the hardware processor, are configured to:
calculate a confidence interval for the determination that the first login hash does not match the first ledger hash, the second login hash does not match the ledger hash, or both;
determine that the confidence interval does not exceed a threshold; and
flag the authentication attempt for further review.

17. The non-transitory computer-readable medium of claim 15, wherein:
the login sample comprises an identifier associated with the entity; and
retrieving the first and second ledger hash comprises finding the block in the blockchain ledger that comprises the identifier associated with the entity.

18. The non-transitory computer-readable medium of claim 17, further comprising instructions that, when executed by the hardware processor, are configured to:
upon receipt of the login sample, determine that the login sample is an audio file comprising a stereo track;
retrieve an audio handler comprising instructions for decomposing the login sample into the first and second layers, wherein the instructions comprise:
isolate the left channel of the stereo track as the first separable code element; and
isolate the right channel of the stereo track as the second separable code element.

19. The non-transitory computer-readable medium of claim 17, further comprising instructions that, when executed by the hardware processor, are configured to:
upon receipt of the login sample, determine that the media sample is an image file;
retrieve an image handler, comprising instructions for decomposing the login sample into the first and second layers, wherein the instructions comprise:
apply an edge detection algorithm to the image to generate the first separable code element; and
apply a blob detection algorithm to the image to generate the second separable code element.

20. The non-transitory computer-readable medium of claim 17, further comprising instructions that, when executed by the hardware processor, are configured to:
upon receipt of the login sample, determine that the media sample is a video file;
retrieve a video handler, comprising instructions for decomposing the login sample into the first and second layers, wherein the instructions comprise:
extract audio data from the video file as the first separable code element; and
extract pixel data from the video file as the second separable code element.

\* \* \* \* \*